United States Patent [19]

Bolick et al.

[11] 4,442,552
[45] Apr. 17, 1984

[54] BIB

[75] Inventors: Martha E. Bolick; Rebecca J. Weber, both of Winnebago County; Theodore B. Lang, Outagamie County, all of Wis.

[73] Assignee: Kimberly-Clark Corporation, Neenah, Wis.

[21] Appl. No.: 225,616

[22] Filed: Jan. 16, 1981

[51] Int. Cl.³ .............................................. A41B 13/00
[52] U.S. Cl. ...................................................... 2/49 R
[58] Field of Search .................. 2/49 R, 49 A, 48, 50, 2/51, 52

[56] References Cited

U.S. PATENT DOCUMENTS

| | | | |
|---|---|---|---|
| 1,991,025 | 2/1935 | Medalie | 2/48 |
| 2,523,565 | 9/1950 | Gardner | 2/49 R |
| 3,032,773 | 5/1962 | Piazze | 2/49 R |
| 3,329,969 | 7/1967 | Farber et al. | 2/49 R |
| 3,857,116 | 12/1974 | Meeker | 2/49 R |

Primary Examiner—Doris L. Troutman
Attorney, Agent, or Firm—William D. Herrick; R. Jonathan Peters; Howard Olevsky

[57] ABSTRACT

Improved one-piece bib construction having a neck opening in the form of a triangle with one side generally parallel to the shoulders of the wearer when in use. The opening is formed by severing along the sides of the triangle not parallel to the wearer's shoulders and preferably folding inward along the other side so that a double layer of absorbent material is located in the front neck and chest area of the wearer. The result is a bib that tends to conform closely to the wearer thus reducing gaps and unprotected areas. Embodiments include those wherein the angle opposite the side parallel the shoulders is about 30° to 120° and the longest side comprises 30% to 95% of the total bib width and is centrally located. Materials include absorbent fibrous webs such as cellulose tissue which may be combined with a film backing as well as sheets of impervious films.

11 Claims, 5 Drawing Figures

BIB

BACKGROUND OF THE INVENTION

1. Field of the Invention

This invention relates to bibs and protective coverings of the type used for infants and for many applications with people of all ages including barber and beauty treatments, dental treatments, and the like. Such bibs are conventionally constructed of a wide variety of materials depending upon the intended application and desired cost. For example, durable materials such as cloth are frequently used for forming infant bibs that are washed and reused many times. On the other hand, many dental offices utilize bibs formed from tissue paper that are discarded after a single use. In between are many constructions including tissue having a liquid-impervious film backing and various weights and thicknesses of film materials.

Particularly with respect to low cost or disposable bib items, it has been difficult to achieve a satisfactory method of providing a closely conforming fit. In particular, such bibs have demonstrated a tendency to gap in the neck area resulting in exposed or unprotected areas. Various forms of neck openings, ties, adhesive attachments and the like have been attempted but none entirely solve this problem, especially for low cost or disposable bib items.

2. Description of the Prior Art

U.S. Pat. No. 3,945,048 to Shearer issued Mar. 23, 1976 describes a one piece bib having neck openings of various configurations. U.S. Pat. No. 2,763,867 to Chagnon describes disposable bibs also with various configurations of neck openings. Other patents of general interest include U.S. Pat. No. 3,488,773 to Stemmer issued Jan. 13, 1970 and U.S. Pat. No. 3,871,027 to Orr issued Mar. 18, 1975. None of these patents discloses the unique bib of the present invention having the neck opening as described more fully below with its attendant advantages.

SUMMARY

The present invention relates to bib constructions, particularly those suited for high speed, low cost manufacture. Such a bib that has improved performance properties is obtained by forming the neck cut-out as a triangle having one side generally parallel to the ends of the bib or the shoulders of the wearer in use. This side of the triangular opening preferably comprises about 30% to 95% of the bib width, and the angle opposite the side parallel the wearer's shoulders in use is preferably in the range of from 30° to 120°. Most preferred values for these parameters are illustrated in FIG. 5. The height of the triangle within these constrictions may be quite small if the side parallel is relatively long, but, in any event, is great enough to form an opening that will accommodate the head of the wearer.

The material of manufacture is preferably a laminate including an air or water laid absorbent fiber sheet on either or both sides of a spunbonded nonwoven sheet, or on one side of a water impervious film of polyethylene, polypropylene or the like. This material has stiffness properties particularly suited for accomplishing the objectives of the present invention. The result is a bib that closely conforms to the wearer and minimizes exposed areas. In a particular preferred embodiment the triangular portion of the cut-out is folded inward along the triangle side parallel the wearer's shoulders to form a double layer of protective material immediately adjacent the wearer's neck area. Alternatively, the triangular portion may be removed entirely.

DESCRIPTION OF THE PREFERRED EMBODIMENTS

Figure 1:
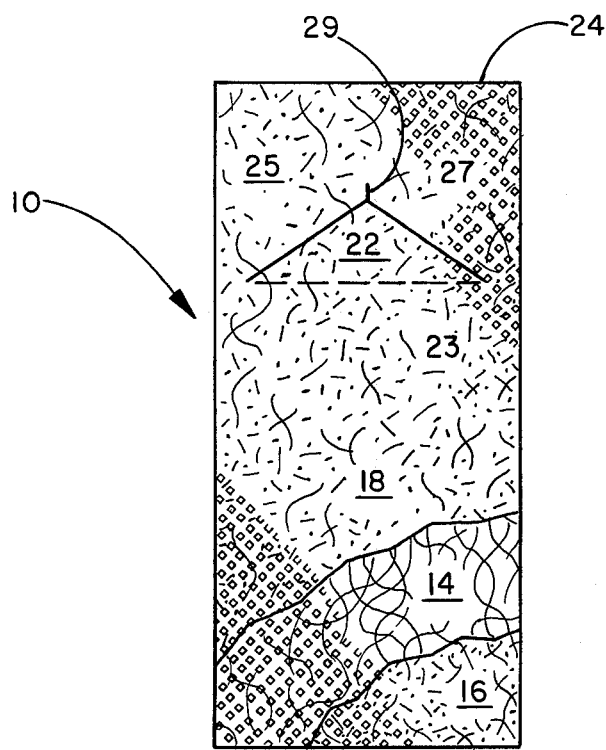
FIG. 1 illustrates one embodiment of the bib of the present invention.

While the invention will be described in connection with preferred embodiments, it will be understood that it is not intended to limit the invention to those embodiments. On the contrary, it is intended to cover all alternatives, modifications and equivalents that may be included in the spirit and scope of the invention as defined by the appended claims.

Selection of a material from which to manufacture the bibs of the present invention involves primarily a matter of choice based on desired cost and performance requirements. For light duty applications, creped wadding in single or multiple layers having a total basis weight in the range of from about 20 lbs./2880 ft$^2$ to 90 lbs./2880 ft$^2$, for example, may be adequate. For more demanding uses, the creped wadding can be combined with a film backing which lends additional strength and broader imperviousness to the combination. Other materials may be utilized as well including nonwovens of various naturally absorbent materials such as rayon as well as hydrophobic materials treated for absorbency. For some applications absorbency may not be a requirement and synthetic films, alone, may be utilized. Such films include, for example, polyolefins, polyesters, and polyurethanes. For most applications the basis weight of such films will be in the range of about $\frac{1}{8}$ mil to 2 mil with $\frac{1}{4}$ to 1 mil preferred. However, in all cases, the material must not be so stiff as to prevent its conforming to the wearer. Within this constriction, it is preferred that the base material be relatively stiff since stiffer materials in cooperation with the triangular opening produce forces resulting in a closely conforming fit. One skilled in this art will recognize the wide variety of materials satisfying these requirements.

The overall dimensions of the bib of the invention will vary also according to the intended use. For infants and small children the dimensions, of course, will be smaller than those required for use with adults. For purposes of the invention, however, it is important that the dimensions of the neck opening be selected so as to permit convenient donning of the bib while resulting in a snug fit. Thus, the opening must be expandable to fit over the intended wearer's head but not so large as to expose the wearer below the neck once it has been put in place. The opening of the present invention provides a unique advantage in that it can be stretched to provide a relatively large opening for the head of the wearer while when in place it naturally assumes a shape forcing the bib snugly against the throat of the wearer. For this purpose, the neck opening is preferably centrally located width-wise in the bib and has its base line in a position to be parallel to the wearer's shoulders in use. The parallel side is preferably about 30% to 95% of the total width of the bib. The other two sides of the triangular opening are preferably equal and joined at an angle of about 30° to 120°, most preferably 100° to 120° opposite the parallel side.

Turning to FIG. 1, an embodiment of the present invention will be discussed. Bib 10 includes base material 12 comprising a central layer 14 of spunbonded polypropylene of a basis weight of 13.8 g/m² and as further described generally in U.S. Pat. No. 3,855,046 to Hansen and Pennings. Such material is available from Kimberly-Clark Corporation under the trademark EVOLUTION ®. On both sides of the spunbonded layer are layers 16, 18 of air-formed polypropylene/wood pulp composite of a basis weight of 53 g/m² each as described in U.S. Pat. No. 4,100,324 to Anderson, Sokolowski, and Ostermeier, and the combination is pattern bonded by heat and pressure generally in the range of from 140° to 285° C. and 15 to 40 PSIG applied at points 20. In this embodiment the neck opening 22 comprises a triangle having a longest side 23 parallel to the ends 24, 26 of the bib and including 75% of the total bib width. The shorter sides 25, 27 meet at an angle of 114° opposite the longest dimension, and the neck opening 22 is centrally located widthwise in the bib. Slit 29 may be included for improved fit adjustment.

Figures 2, 3:
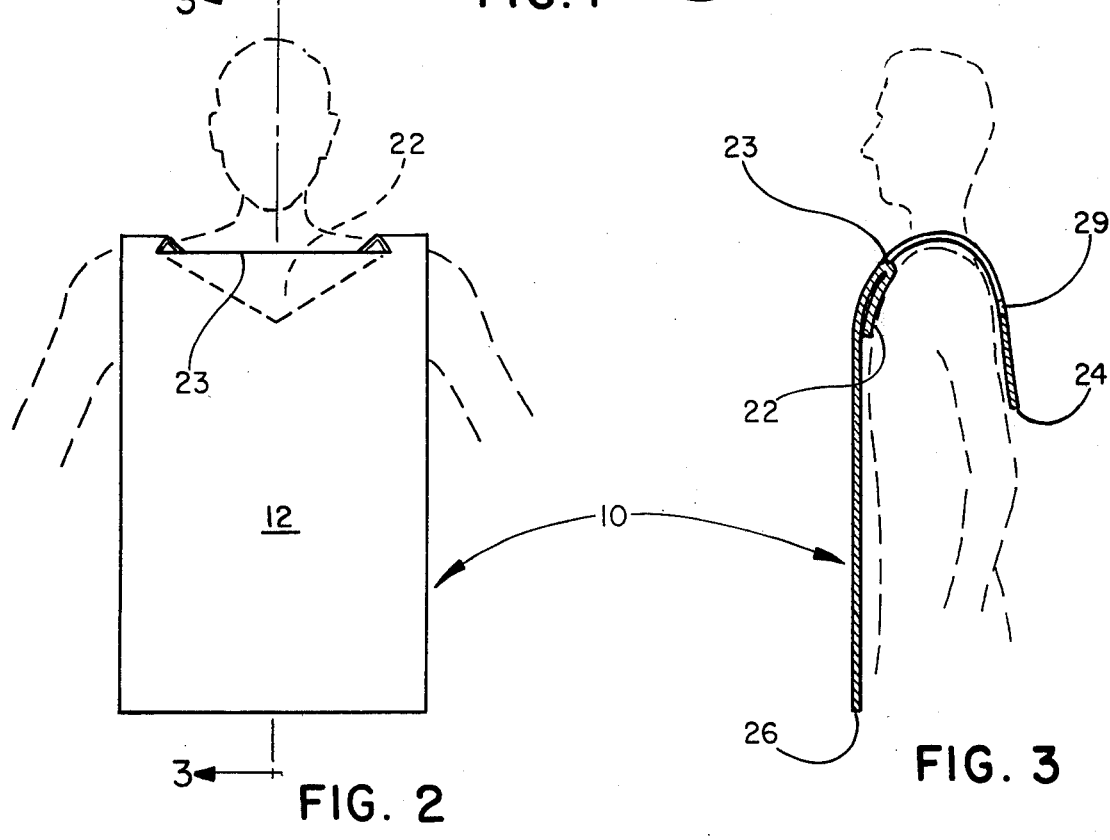
FIGS. 2 and 3 illustrate a second embodiment of the bib of the present invention in use.

Turning to FIGS. 2 and 3, it can be seen that the bib 10 of the present invention in use forms a snug, conforming covering which minimized exposed areas of the wearer. Furthermore, the embodiment of FIGS. 2 and 3 include folding the cut-out portion 22 inward along the side 23 of the triangular openings parallel the wearer's shoulders so as to provide additional absorbent material adjacent the wearer's neck in an area where it is most likely to be needed.

Figure 4:
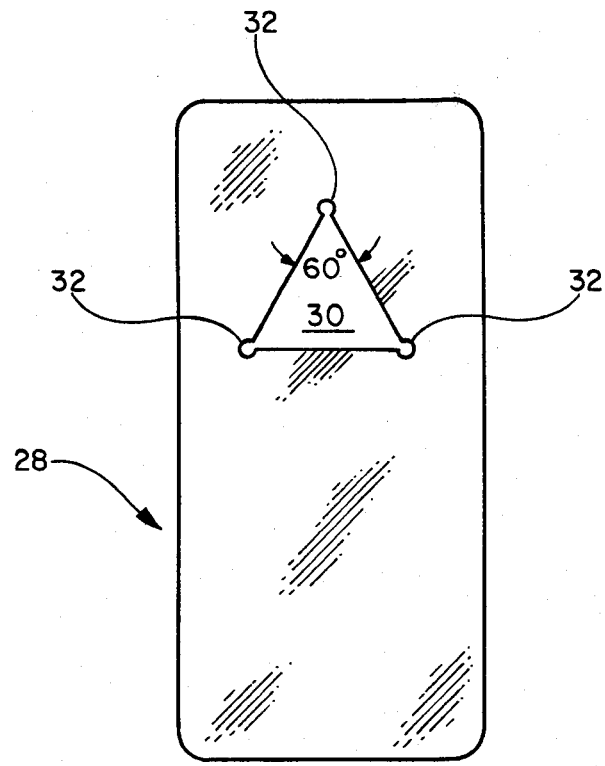
FIG. 4 illustrates a preferred triangular configuration of the neck opening of the bib of the present invention.

FIG. 4 illustrates an alternate embodiment wherein bib 28 is formed of a film and neck opening 30 has a different shape of an equalateral triangle as well as circular cut-outs 32 at the triangle corners for less risk of tear propagation.

Figure 5:
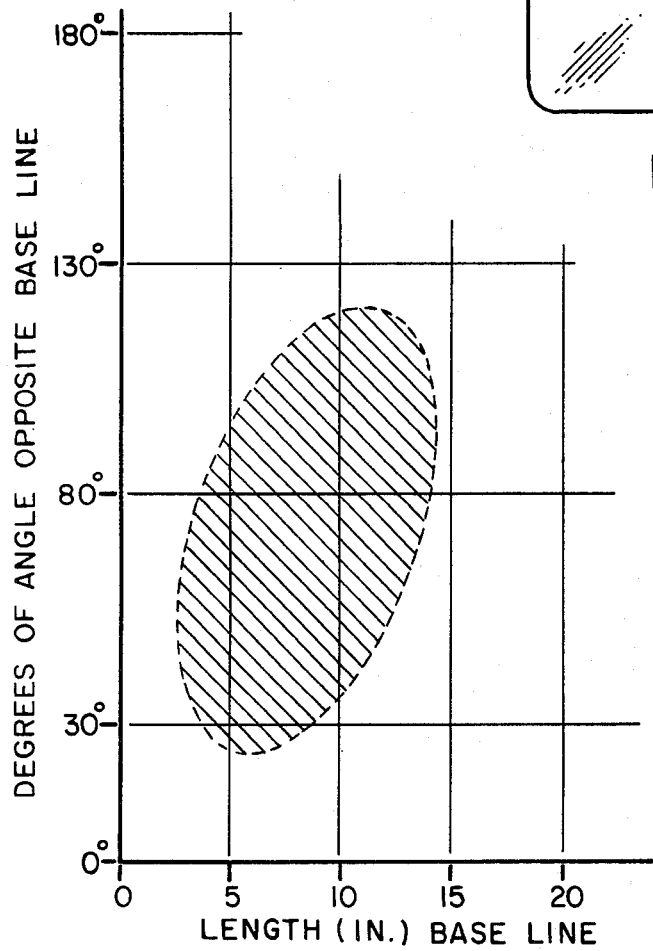
FIG. 5 graphically illustrates preferred angle and base line parameters for the bibs of the present invention.

FIG. 5 illustrates in schematic form the most effective neck opening configurations for use in connection with the bib of the present invention. Shown graphically are the parameters of base line length and opposite angle which define the neck opening. In accordance with the invention it has been found that bibs having openings as defined exhibit the unexpected benefits described above. It can be seen that many such configurations can be devised, but that the essential characteristics of the triangular opening with the side parallel to the shoulders of the wearer and the size of the opening consistent with its intended use are demonstrated in each such embodiment. These characteristics are critical in achieving the desired results of a self-fitting, close conforming bib.

Thus it is apparent there has been provided in accordance with the invention, a bib that fully satisfies the objects, aims, and advantages set forth above. While the invention has been described in conjunction with specific embodiments thereof, it is evident that many alternatives, modifications and variations will be apparent to those skilled in the art in light of the foregoing descriptions. Accordingly, it is intended to embrace all such alternatives, and variations as fall within the spirit and broad scope of the appended claims.

We claim:

1. In a bib formed from a flexible material and having a size consistent with its intended use and means defining an opening for placing the bib over the wearer, the improvement wherein said defined opening comprises a triangular shape having three corners and a base line side of the triangle 30% to 95% of the total bib width and in a position to be generally parallel to the shoulders of the wearer in use and the other two sides of the triangle meet forming an angle opposite the longest side in the range of about 30° to 120°.

2. The bib of claim 1 wherein the flexible material is a pattern bonded laminate including a central meltblown polypropylene layer with an airformed composite of polypropylene and wood pulp on either side.

3. The bib of claim 2 wherein the opposite angle is in the range of from about 100° to 120°.

4. The bib of claim 1 wherein the corners of said triangle have circular cut-outs.

5. The bib of claim 1 folded back upon itself along said base line.

6. The bib of claim 1 wherein said flexible material includes a film.

7. The bib of claim 6 wherein the opposite angle is in the range of from about 100° to 120°.

8. The bib of claim 1 further including a slit in the triangle corner opposite said base line for improved fit adjustment.

9. The bib of claim 1 wherein said triangular opening is further defined by the shaded area of FIG. 5.

10. The bib of claim 3 wherein said triangular opening is further defined by the shaded area of FIG. 5.

11. The bib of claim 1 wherein the flexible material includes a spunbonded layer and a layer of an airformed composite of polypropylene and wood pulp.

* * * * *